(12) United States Patent
Chen et al.

(10) Patent No.: US 9,124,533 B2
(45) Date of Patent: Sep. 1, 2015

(54) SERVICE BANDWIDTH CONFIGURING METHOD AND NETWORK MANAGEMENT SYSTEM

(75) Inventors: Jie Chen, Shenzhen (CN); Qingfei Nian, Shenzhen (CN); Qiaogang Chen, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 1009 days.

(21) Appl. No.: 12/510,708

(22) Filed: Jul. 28, 2009

(65) Prior Publication Data

US 2009/0287809 A1    Nov. 19, 2009

Related U.S. Application Data

(63) Continuation of application No. PCT/CN2007/002459, filed on Aug. 15, 2007.

(30) Foreign Application Priority Data

Jan. 31, 2007   (CN) .......................... 2007 1 0003116

(51) Int. Cl.
*G06F 15/16* (2006.01)
*H04L 12/24* (2006.01)

(52) U.S. Cl.
CPC ........ *H04L 41/5022* (2013.01); *H04L 41/0896* (2013.01); *H04L 41/0213* (2013.01); *H04L 41/0233* (2013.01)

(58) Field of Classification Search
CPC ............ H04L 41/0896; H04L 41/0213; H04L 41/0233

USPC .......................................................... 709/223
See application file for complete search history.

(56) References Cited

U.S. PATENT DOCUMENTS

| 6,262,976 B1 * | 7/2001 | McNamara .................... 370/254 |
| 7,257,640 B1 * | 8/2007 | Callocchia et al. ........... 709/233 |
| 7,362,975 B2 * | 4/2008 | Choi et al. ...................... 398/58 |

(Continued)

FOREIGN PATENT DOCUMENTS

| CN | 1863142 A | 11/2006 | ............. H04L 12/56 |
| EP | 1111840 A2 | 11/2000 | ............. H04L 12/24 |

OTHER PUBLICATIONS

International Telecommunication Union, "Telecommunication Standardization Sector, TD 249 (GEN/4)", Sep. 2006, 126 pages.

*Primary Examiner* — Douglas Blair (57) ABSTRACT

A service bandwidth configuring method of is provided by this invention, which includes the following steps: defining various kinds of service classes according to the characteristics of various services provided by a network system; defining various kinds of bandwidth specifications of the network system; establishing the mapping relationships between the various kinds of service classes and various kinds of bandwidth specifications; and configuring the service bandwidth of the network system with the mapping relationships. Besides, this invention also provides a network management system. This invention is intended to be applied to the interfaces between NMS and EMS, or interfaces between EMS and NE, and it facilitates the intercommunication between the network management systems of different manufacturers, and the unified management on network management system or devices from different manufacturers by the upper layer network management system.

14 Claims, 3 Drawing Sheets

(56) References Cited

U.S. PATENT DOCUMENTS

| | | | |
|---|---|---|---|
| 7,756,026 B2 * | 7/2010 | Weiss et al. | 370/230 |
| 7,843,843 B1 * | 11/2010 | Papp et al. | 370/252 |
| 7,990,978 B1 * | 8/2011 | Chamas et al. | 370/395.21 |
| 8,089,986 B2 * | 1/2012 | Adamczyk et al. | 370/468 |
| 8,718,057 B1 * | 5/2014 | Rabie et al. | 370/390 |
| 2002/0006112 A1 * | 1/2002 | Jaber et al. | 370/238 |
| 2003/0061338 A1 * | 3/2003 | Stelliga | 709/224 |
| 2005/0157729 A1 * | 7/2005 | Rabie et al. | 370/395.53 |
| 2005/0157751 A1 * | 7/2005 | Rabie et al. | 370/466 |
| 2005/0160180 A1 * | 7/2005 | Rabje et al. | 709/238 |
| 2005/0169279 A1 * | 8/2005 | Magd et al. | 370/395.5 |
| 2006/0002370 A1 * | 1/2006 | Rabie et al. | 370/351 |
| 2007/0206602 A1 * | 9/2007 | Halabi et al. | 370/395.4 |
| 2008/0144632 A1 * | 6/2008 | Rabie et al. | 370/395.5 |
| 2008/0201463 A1 * | 8/2008 | Elliott et al. | 709/223 |
| 2010/0220724 A1 * | 9/2010 | Rabie et al. | 370/392 |
| 2010/0246603 A1 * | 9/2010 | Rabie et al. | 370/466 |
| 2011/0038382 A1 * | 2/2011 | Peterson et al. | 370/401 |
| 2011/0216779 A1 * | 9/2011 | Peterson et al. | 370/401 |

* cited by examiner

SERVICE BANDWIDTH CONFIGURING METHOD AND NETWORK MANAGEMENT SYSTEM

This is a continuation of International Application PCT/CN2007/002459, with an International Filing date of Aug. 15, 2007, which claims priority to Chinese application No. 200710003116.0, filed Jan. 31, 2007, each of which is incorporated by reference.

TECHNICAL FIELD

This invention relates to communication field, more particularly, to a method and network management system for configuring service bandwidth.

BACKGROUND OF THE INVENTION

EoT Ethernet over Transport technique is capable of packing Ethernet frames and mapping them into transmission channel (e.g. Virtual Container Group of SDH), and then transmitting them, through embedding Ethernet function and interfaces in transmission equipment (for example, SDH). In EoT system, configuration management of Ethernet service bandwidth is usually realized by setting overall bandwidth parameters of Ethernet port (UNI (User Network Interfaces) or NNI (Network Node Interfaces)) with network management system, which doesn't distinguish different service types of Ethernet, thereby can't meet the requirement of fine management on Ethernet service bandwidth.

SUMMARY OF THE INVENTION

The aim of this invention is to provide a network management system configuring method and network management system used for Ethernet service bandwidth, especially used for EoT system in communication field, of which bandwidth of Ethernet service is set by network management system.

A service bandwidth configuring method is provided according to one aspect of this invention, following steps are included: defining various kinds of service classes according to characteristics of various services provided by network system; defining various kinds of bandwidth specifications of the network system; establishing the mapping relationships between the various kinds of service classes and the various kinds of bandwidth specifications; and configuring the service bandwidth of network system with the mapping relationships.

In the above service bandwidth configuring method, the definition various kinds of service classes according to characteristics of various services provided by network system includes the followings: creating ServiceClassProfile objects; and define various kinds of service classes with the ServiceClassProfile objects. Wherein the ServiceClassProfile objects include at least one among the followings: attributes of classifyType that are used to specify the rules for classifying service classes, the rules reflect the characteristics of various kinds of services provided by network system; and attributes of classifyValue that are used to specify identifier values of various kinds of service classes divided based on the certain rules;

In the above service bandwidth configuring method, data type of attribute of classifyType is string type.

In the above service bandwidth configuring method, the classifyType includes at least one among the followings: virtual LAN ID, virtual LAN priority, Ethernet connection ID, and Ethernet virtual connection ID.

In the above service bandwidth configuring method, data type of attribute of classifyValue is string type.

In the above service bandwidth configuring method, the definition of various kinds of bandwidth specifications of network system include the following steps: creating BandwidthProfile objects, which include at least one among the followings: committed information rate attribute that is used to designate the minimum bandwidth guarantee of service; committed burst size attribute that is used to designate the minimum burst size guarantee of service; excess information rate attribute that is used to designate the rate allowed exceeding the minimum bandwidth guarantee of service; and excess burst size attribute that is used to designate the burst size allowed exceeding minimum guarantee of service; defining various kinds of bandwidth specifications with the BandwidthProfile objects.

In the above service bandwidth configuring method, data types of committed information rate attribute, committed burst size attribute, excess information rate attribute and excess burst size attribute are all integer type.

In the above service bandwidth configuring method, the establishment of mapping relationships between various kinds of service classes and various kinds of bandwidth specifications includes the following steps: creating service bandwidth mapping objects, which include follows: ServiceClassProfile pointer attributes that include identifier of BandwidthProfile objects used to describe service classes; ingress bandwidth pointer attribute that includes identifier of BandwidthProfile objects used to describe ingress bandwidth of service; and egress BandwidthProfile pointer property that includes identifier of BandwidthProfile objects used to describe egress bandwidth of service; defining the mapping relationships with service bandwidth mapping objects.

In the above service bandwidth configuring method, the configuration of service bandwidth of network system with the mapping relationships includes the following steps: creating network connection objects, which include attributes of flow point list that are used to express all of the flow points included in network connection; wherein the creation of flow point objects is corresponding to port FPP of network connection, attribute parameters of flow point objects include: attributes of service bandwidth mapping list, which include a set of one or more identifier of service bandwidth mapping objects, and is used to describe bandwidth configuration of various services of network connection on network ports; adding the flow objects into network connection objects when network connection objects are created; associating the service bandwidth mapping objects to the flow point objects for configuring service bandwidth of network system.

In the above service bandwidth configuring method, network system is Ethernet.

In the above service bandwidth configuring method, Ethernet is Ethernet over Transport, and service bandwidth configuring method is carried out with the network management system for Ethernet over Transport.

In the above service bandwidth configuring method, service bandwidth configuring method is carried out by means of NMS-EMS interfaces or EMS-NE interfaces of above network management system.

Network management system in Ethernet over Transport is provided according to another aspect of this invention, which includes the followings: Service class definition module that is used to create Ethernet ServiceClassProfile objects, which are used to define various kinds of service classes according to characteristic of various services provided by network system; bandwidth specification module that is used to create Ethernet BandwidthProfile objects, which are used to define various kinds of bandwidth specifications of network system; mapping relationship definition module that is used to create Ethernet service bandwidth mapping objects, which are used to establish the mapping relationship between various kinds of service classes and various kinds of bandwidth specifications; and service bandwidth configuration module that is used to create Ethernet connection or Ethernet virtual connection objects, which associate Ethernet service bandwidth mapping objects to flow point objects in Ethernet connection or Ethernet virtual connection objects for configuring service bandwidth of network system.

In the above network management system, ServiceClassProfile objects include at least one among the followings: classifyType attribute that is used to specify rules for classifying service classes, which reflect characteristic of various kinds of services provided by network system; and classifyValue attribute that is used to designate identifier values of various kinds of service classes classified according to the rules.

BandwidthProfile objects include at least one among the followings: committed information rate attribute that is used to designate the minimum bandwidth guarantee; committed burst size attribute that is used to designate the minimum burst size guarantee of service; excess information rate that is used to designate the rate allowed exceeding the minimum bandwidth guarantee of service; and excess burst size that is used to designate the burst size allowed exceeding the minimum guarantee of service.

Service bandwidth mapping objects include at least one among the followings: ServiceClassProfile pointer attributes that include identifier of BandwidthProfile objects used to describe service classes; ingress BandwidthProfile pointer attributes that include identifier of BandwidthProfile objects used to describe ingress bandwidth of service; and egress BandwidthProfile pointer attributes that include identifier of BandwidthProfile objects used to describe egress bandwidth of service. Attribute parameters of Ethernet connection or Ethernet virtual connection objects include at least one among the followings: attribute of flow point list that is used to express all of the flow points included in Ethernet connection or Ethernet virtual connection; wherein the creation of flow point objects is corresponding to port FPP of Ethernet connection or Ethernet virtual connection, attribute parameters of flow point objects include: attributes of service bandwidth mapping list, which include a set of one or more identifier of service bandwidth mapping objects, and is used to describe bandwidth configuration of various services of Ethernet connection or Ethernet virtual connection on network ports; adding the flow Point objects into Ethernet connection or Ethernet virtual connection objects when Ethernet connection or Ethernet virtual connection objects are created;

This invention realizes the method of configuring bandwidth respectively according to different service classes used for Ethernet bandwidth of network system, e.g. EoT system. Meanwhile, Ethernet ServiceClassProfile objects and Ethernet BandwidthProfile objects can be shared and used together, so that reduce redundant creation of the same objects and occupation of system storage space; Ethernet service bandwidth mapping objects further realize Ethernet service classification and flexible configuration of Ethernet bandwidth. This invention is intended to be applied to interfaces between NMS and EMS, or interfaces between EMS and NE, and it facilitates the intercommunication between the network management systems of different manufacturers, and the unified management on network management system or devices for different manufacturers by the upper layer network management system.

Other characteristics and advantages of this invention are described in the following content, and part of them is obvious in this description or can be understood through implementing this invention. Purpose and other advantages of this invention can be realized and obtained from specially indicated structure of description, claims and figures.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein.

PRACTICAL IMPLEMENTATION METHOD

This invention is illuminated in the content below with reference to figures and embodiment.

Figure 1:
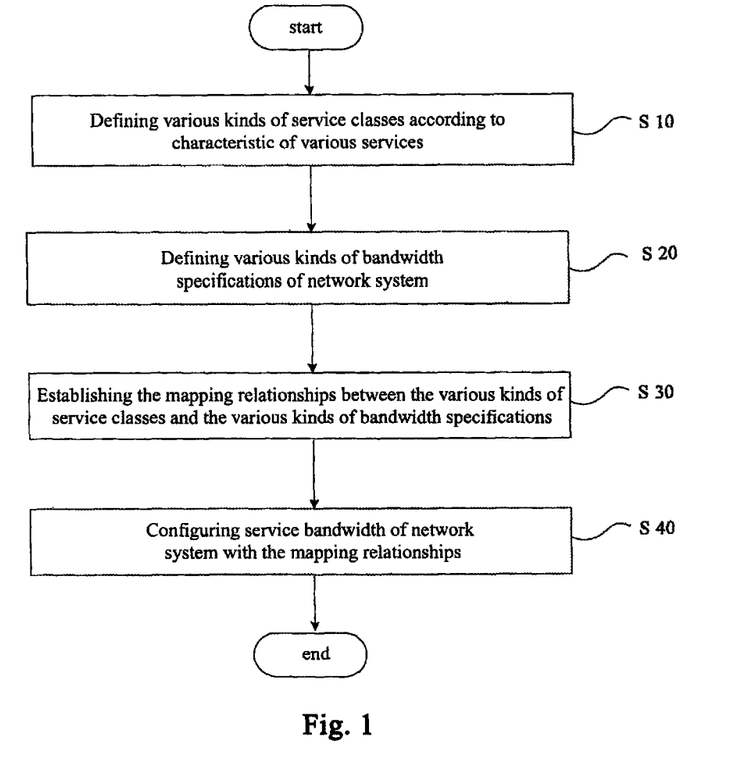
FIG. 1 is a flow chart of service bandwidth configuring method according to this invention.

FIG. 1 is a flow chart of service bandwidth configuring method according to this invention that includes the following steps:

Step S10: Defining various kinds of service classes according to characteristic of various services provided by network system;

Step S20: Defining various kinds of bandwidth specifications of network system;

Step S30: Establishing the mapping relationship between various kinds of service classes and various kinds of bandwidth specifications; and Step S40: Configuring service bandwidth of network system with the mapping relationship.

It can be seen that scheme above provides a method that is used to configure and manage service bandwidth of network system according to different service classification with network management system. The above service bandwidth configuring method is illuminated as follows with example of EoT.

According to an embodiment of the invention, a method for configuring the service bandwidth of Ethernet of EOT with network system is provided, which comprises the following steps:

1) Creating Ethernet ServiceClassProfile Objects

Upper layer network management system transmits an object creation request pack to the system under management to create Ethernet ServiceClassProfile objects. The request pack contains attribute parameters of Ethernet ServiceClassProfile.

The attribute parameters of ServiceClassProfile objects have classifyType and classifyValue.

ClassifyType is expressed by a string and used to specify rule of service classification. for example, according to virtual LAN ID, virtual LAN priority or Ethernet virtual connection ID. Therefore, classifyType can be expressed by the following strings: 'VlanID', 'VlanPriority', 'EVCID'.

ClassifyValue is used to specify value of service class under some classifyType and is a set of string. For example, classifyValue can be any arbitrary one or their combination among values from string '1' to string '4094' if classifyType is 'VlanID'. In order to make it brief, as to continuous string combination, the form of 'x-y' can be used, in which x and y indicate the start and the end of the continuous number, respectively, e.g., '5-100' indicates all of virtual LAN ID value from 5 to 100.

ClassifyValue can be any arbitrary one or their combination among values from string '0' to string '7' if classifyType is 'VLAN priority'.

The above objects creation processes can be carried out many times to create different Ethernet ServiceClassProfile objects for the subsequent use.

As to Ethernet ServiceClassProfile objects having been created, the upper layer network management system can inquire and modify the attribute values of the objects, or delete the objects.

2) Creating Ethernet BandwidthProfile Objects

The upper layer network management system transmits an object creation request pack to system under management to create Ethernet BandwidthProfile objects. The request pack contains attribute parameters of Ethernet BandwidthProfile.

The attribute parameters of the Ethernet BandwidthProfile include at least one among the followings: committed information rate (CIR), committed burst size (CBS), excess information rate (EIR), and excess burst size (EBS).

Data types of committed information rate, committed burst size, excess information rate and excess burst size are all integer type. Default unit of committed information rate and excess information rate is bit/s; default unit of committed burst size and excess burst size is byte.

As to the Ethernet BandwidthProfile objects having been created, upper layer network management system may inquire the attribute values of the objects, or delete the objects.

3) Creating Ethernet Service Bandwidth Mapping Objects

Upper layer network management system transmits an object creation request pack to the system under management to create Ethernet service bandwidth mapping objects. The request pack contains attribute parameters of the Ethernet service bandwidth mapping objects.

The attribute parameters of the Ethernet service bandwidth mapping objects include at least one among the followings: Ethernet ServiceClassProfile pointer, ingress BandwidthProfile pointer and egress BandwidthProfile pointer.

Wherein, the Ethernet ServiceClassProfile pointer attribute is Ethernet ServiceClassProfile ID having been created that is used to describe some class of Ethernet service.

The ingress bandwidth pointer attribute is Ethernet BandwidthProfile ID having been created that is used to describe ingress bandwidth of Ethernet service.

The egress bandwidth pointer attribute is Ethernet BandwidthProfile ID having been created (it can be the same with the ingress bandwidth pointer or not) that is used to describe egress bandwidth of Ethernet service.

With the above specification of attribute, the objects can flexibly map the Ethernet BandwidthProfile objects having been created into ingress bandwidth and egress bandwidth configuration of some class of Ethernet service (Ethernet ServiceClassProfile objects).

As to the Ethernet service bandwidth mapping objects having been created, the upper layer network management system may inquire and modify the attribute values of the objects, or delete the objects.

4) Associating the Ethernet Service Bandwidth Mapping Objects with the Ethernet Port FPP As to the Ethernet service bandwidth mapping objects having been created, they can be associated with the end point of some Ethernet connection or Ethernet virtual connection, namely, Ethernet flow point. Thereby, designating process of service bandwidth of Ethernet connection (or Ethernet virtual connection) end point is carried out.

Upper layer network management system transmits an object attribute setting request pack to system under management to set attributes of flow point object of some Ethernet port. The attribute setting request pack contains attribute parameters of Ethernet service bandwidth mapping list.

Attribute of Ethernet service bandwidth mapping list is a set of one or more of Ethernet service bandwidth mapping objects ID having been created which realizes flexible configuration for different Ethernet service classes.

Step 1 and step 2 above are not limited by certain order.

Upper layer network management system and system under management can carry out the operations of creation, deletion, inquiry and modification with standard protocols, such as CORBA SNMP and CMIR.

Figure 2:
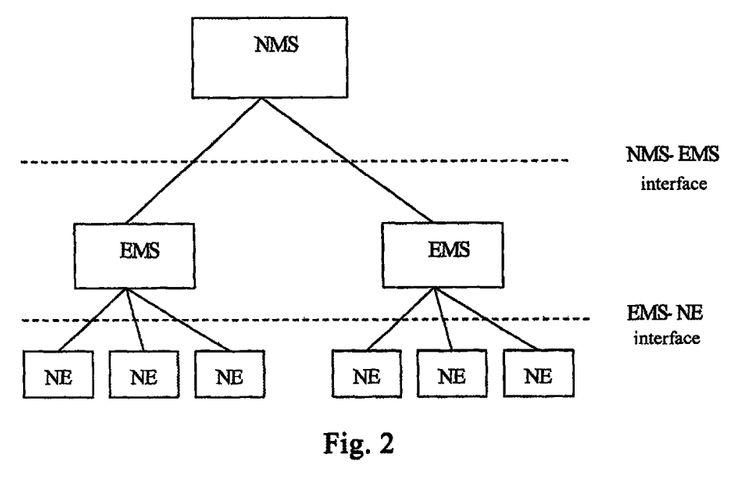
FIG. 2 a schematic diagram of NMS-EMS interfaces and EMS-NE interfaces applicable to this invention.

Operation steps above are applicable to interfaces between network management system and element management system, as well as to interfaces between element management system and network element. In another word, Upper layer network management system can be network management system, or element management system. If the upper layer network management system is network management system, system under management is element management system accordingly, and if the upper layer network management system is element management system, system under management is network element accordingly. FIG. 2 is a schematic diagram of NMS-EMS interfaces and EMS-NE interfaces applicable to this invention.

Figure 3:
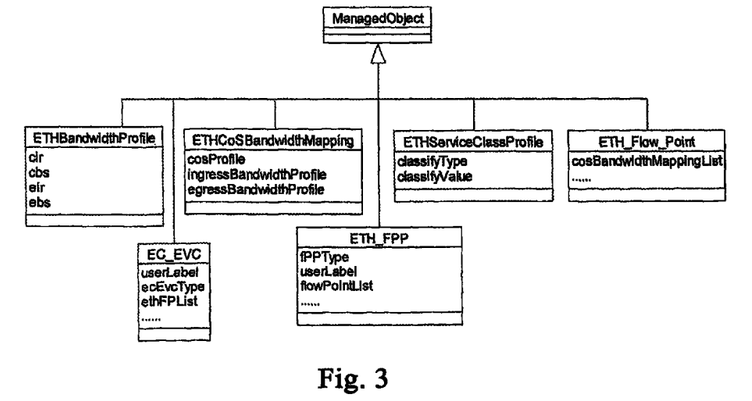
FIG. 3 is UML class diagram relevant to objects defined in this invention.

As shown in FIG. 3, this invention defines object class general model related to the Ethernet service bandwidth configuration that includes the followings:

1 ETH ServiceClassProfile

This object class indicates Ethernet ServiceClassProfile, which includes following relevant attributes:

| Name | Description | Type |
| --- | --- | --- |
| classifyType | This attribute defines classifyType of Ethernet service, such as based on VLAN ID, VLAN priority (IEEE 802.1p definition) and EVC, etc. (Permitted operations: GET, REPLACE) | String ("VlanID", "VlanPriority" "EVCID") |
| classifyValue | This attribute lists characteristic value specified according to the classifyType attribute above, hence a certain service class can be confirmed. (Permitted operations: GET, REPLACE) | Set of String |

2) ETH BandwidthProfile

This object classe indicates Ethernet BandwidthProfile, which includes following relevant attributes:

| Name | Description | Type |
| --- | --- | --- |
| CIR | This attribute indicates commited information rate, of which unit is bit/s. (Permitted operations: GET, SET-BY-CREATE) | Integer (Units: bits per second) |
| CBS | This attribute indicates commited burst size, of which unit is byte. (Permitted operations: GET, SET-BY-CREATE) | Integer (Units: bytes) |
| EIR | This attribute indicates excess information rate, of which unit is bit/s. (Permitted operations: GET, SET-BY-CREATE) | Integer (Units: bits per second) |

| Name | Description | Type |
|---|---|---|
| EBS | This attribute indicates excess burst size, of which unit is byte. (Permitted operations: GET, SET-BY-CREATE) | Integer (Units: bytes) |

3 ETHCoSBandwidthMapping

This object class indicates Ethernet service bandwidth mapping, which includes following relevant attributes:

| Name | Description | Type |
|---|---|---|
| serviceClassProfilePtr | This attribute indicates some Ethernet service class by specifying an Ethernet ServiceClassProfile object. It indicates all service if the pointer is null. (Permitted operations: GET, REPLACE) | ETHServiceClassProfileID |
| ingressBandwidthProfilePtr | This attribute indicates ingress bandwidth of some Ethernet service class by specifying an Ethernet bandwidth profile object. (Permitted operations: GET, REPLACE) | ETHBandwidthProfileID |
| egressBandwidthProfilePtr | This attribute indicates egress bandwidth of some Ethernet service class by specifying an Ethernet bandwidth profile object. (Permitted operations: GET, REPLACE) | ETHBandwidthProfileID |

4 ETH_Flow_Point

This object class indicates Ethernet flow point, which includes following relevant attributes:

| Name | Description | Type |
|---|---|---|
| cosBandwidthMappingList | This attribute indicates bandwidth configuration of various kinds of classes of service of the Ethernet flow point. (Permitted operations: GET ADD, REMOVE, REPLACE) | Set of ETHCoSBandwidthMappingID |

5 ETH_FPP

This object class indicates Ethernet port, which includes following relevant attributes:

| Name | Description | Type |
|---|---|---|
| flowPointList | This attribute indicates end points(flow points) of all Ethernet connections included in this Ethernet port. (Permitted operations: GET ADD, REMOVE, REPLACE) | Set of ETH_Flow_PointID |

6 EC_EVC

This object class indicates Ethernet connection or Ethernet virtual connection, which includes following relevant attributes:

| Name | Description | Type |
|---|---|---|
| ethFPList | This attribute indicates all end points (flow points) included in this Ethernet connection or Ethernet virtual connection. (Permitted operations: GET ADD, REMOVE, REPLACE) | Set of ETH_Flow_PointID |

Figure 4:
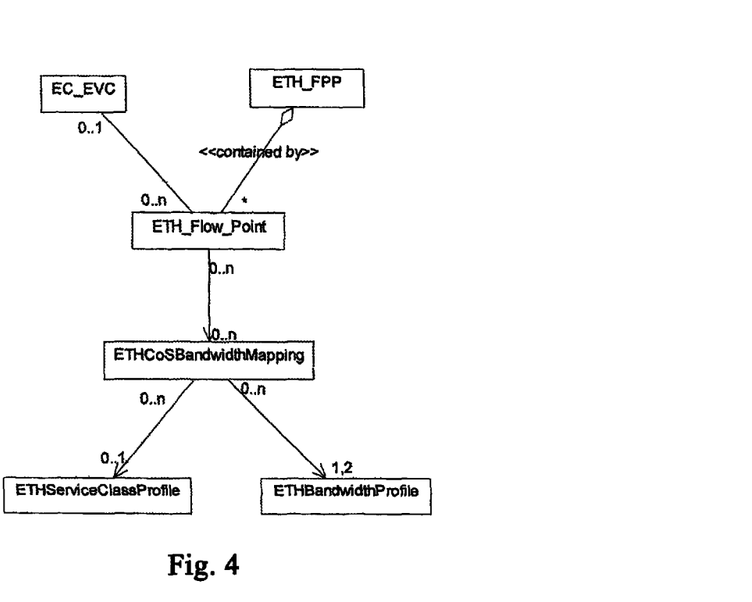
FIG. 4 is UML class diagram used to describe relevant objects class relationship defined in this invention.

The relationships among object classes above is shown in UML class diagram of FIG. 4.

This invention realizes communication between NMS and EMS and operations on objects based on CORBA protocol. NMS can accomplish the operations, such as creation, deletion, inquiry on the above objects as well as the modification on attributes with respect to the EMS by means of CORBA protocol.

According to the methods described above, this invention also provides a network management system in Ethernet over Transport, which includes the followings: Service class definition module that is used to create Ethernet ServiceClassProfile objects, which are used to define various kinds of service classes according to characteristic of various kinds of services provided by network system; Service specification module that is used to create Ethernet BandwidthProfile objects, which are used to define various kinds of bandwidth specifications of network system; Mapping relationship definition module that is used to create Ethernet service bandwidth mapping objects, which are used to establish the mapping relationship between various kinds of service classes and various kinds of bandwidth specifications; and Service bandwidth configuration module that is used to create Ethernet connection or Ethernet virtual connection objects, which associate Ethernet service bandwidth mapping objects to flow point objects of Ethernet connection or Ethernet virtual connection objects for configuring service bandwidth of network system. Configurations of these objects have been described in detail in above, so they won't be described again here.

It can be seen from the description above that this invention realizes a method of configuring bandwidth respectively according to different service classes used for Ethernet bandwidth of network system, e.g. EoT system. Meanwhile, Ethernet ServiceClassProfile objects and Ethernet BandwidthProfile objects can be shared and used together, so that reduce redundant creation of the same objects and occupation of system storage space; Ethernet service bandwidth mapping objects further realize Ethernet service classification and flexible configuration of Ethernet bandwidth. This invention is intended to be applied to interfaces between NMS and EMS, or interfaces between EMS and NE, and it facilitates the intercommunication between the network management systems of different manufacturers, and the unified management on network management system or devices for different manufacturers by the upper layer network management system.

Obviously, one skilled in the art shall understand that various modules and steps above can be realized with general computing devices and can be integrated into one single computing device or distributed within a network consisting of multiple computing devices, and alternatively, the various modules and steps above can be realized with the program codes executable by the computing devices, and thus these program codes can be stored in memory devices so as to be executed by the computing devices, or the various modules and steps above can be formed into individual integrated circuit modules, or a plurality of the modules or steps can be formed into a single integrated circuit module so as to be realized. Therefore, the present invention is not limited to any particular hardware or software combination. It should be understood that alterations of the embodiments are apparent to one skilled in the art and do not depart from the scope and spirit of the present invention.

The descriptions above are only preferable embodiments of the present invention and are not intended to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A service bandwidth configuring method, comprising:
   defining various kinds of service classes according to the characteristics of various services provided by a network system;
   defining various kinds of bandwidth specifications of the network system;
   establishing the mapping relationships between the various kinds of service classes and the various kinds of bandwidth specifications; and
   configuring the service bandwidth of the network system with the mapping relationships,
   wherein the bandwidth specifications comprise one of the followings: committed information rate (CTR), committed burst size (CBS), excess information rate (EIR), and excess burst size (EBS);
   wherein the various services comprise ServiceClassProfile objects, of which the attribute parameters include: attribute of classifyType for specifying the rules for classifying service classes, the rules reflecting the characteristics of various services provided by the network system; and attribute of classifyValue for specifying the ID value of various service classes classified by the rules; and the various kinds of service classes are defined by at least one of the following: virtual LAN ID, virtual LAN priority, Ethernet connection ID, and Ethernet virtual connection ID;
   wherein the establishing the mapping relationships between the various kinds of service classes and the various kinds of bandwidth specifications comprises the following steps:
   creating service bandwidth mapping objects, of which the attribute parameters include the follows:
      ServiceClassProfile pointer attribute including the ID of the BandwidthProfile objects used to describe the service classes;
      ingress bandwidth pointer attribute including the ID of the BandwidthProfile objects used to describe ingress bandwidth of service; and
      egress BandwidthProfile pointer attribute including the ID of the BandwidthProfile objects used to describe egress bandwidth of service;
   defining the mapping relationships with the service bandwidth mapping objects.

2. The service bandwidth configuring method according to claim 1, wherein the defining various kinds of service classes according to the characteristics of various services provided by a network system comprises the followings:
   creating the ServiceClassProfile objects
   defining the various service classes with the ServiceClassProfile objects.

3. The service bandwidth configuring method according to claim 2, wherein the classifyType includes at least one among the followings: virtual LAN ID, virtual LAN priority, Ethernet connection ID, and Ethernet virtual connection ID.

4. The service bandwidth configuring method according to claim 2, wherein the defining various kinds of bandwidth specifications of the network system comprises the following steps:
   creating BandwidthProfile objects, of which the attribute parameters include at least one among the follows:
      committed information rate attribute for designating minimum bandwidth guarantee of service;
      committed burst size attribute for designating minimum bust size guarantee of service;
      excess information rate attribute for designating the rate allowed exceeding the minimum bandwidth guarantee of service; and
      excess burst size attribute for designating the burst size allowed exceeding minimum guarantee of service;
   defining the various kinds of bandwidth specifications with the BandwidthProfile objects.

5. The service bandwidth configuring method according to claim 4, wherein the data types of the committed information rate attribute, the committed burst size attribute, the excess information rate attribute and the excess burst size attribute are all integer type.

6. The service bandwidth configuring method according to claim 1, wherein the data type of attribute of the classifyType is a string type.

7. The service bandwidth configuring method according to claim 1, wherein the data type of attribute of the classifyValue is string type.

8. The service bandwidth configuring method according to claim 1, wherein the configuring the service bandwidth of the network system with the mapping relationships comprises the following steps: creating network connection objects, of which the attribute parameters of the network connection objects comprise: attribute of flow point list for indicating all of the flow points included in the network connection; wherein, creating flow point objects corresponding to port FPP of the network connection, and the attribute parameters of the flow point objects comprise: attribute of service bandwidth mapping list including a set of one or more the ID of service bandwidth mapping objects for describing the bandwidth configuration of various services of the network connection on the network port; adding the flow point objects into the network connection objects when the network connection objects are created; associating the service bandwidth mapping objects to the flow point objects for configuring the service bandwidth of the network system.

9. The service bandwidth configuring method according to claim 1, wherein the network system is Ethernet.

10. The service bandwidth configuring method according to claim 9, wherein the Ethernet is Ethernet over Transport, and the service bandwidth configuring method is carried out by means of network management system in the Ethernet over Transport.

11. The service bandwidth configuring method according to claim 10, wherein the service bandwidth configuring method is carried out by means of interfaces of NMS-EMS or EMS-NE of the network management system.

12. A network management computing device in an Ethernet for transmission, comprising:
service class definition module for creating Ethernet ServiceClassProfile objects, which are used to define various kinds of service classes according to characteristic of various services provided by a network system;
bandwidth specification module for creating Ethernet BandwidthProfile objects, which are used to define various kinds of bandwidth specifications of the network system;
mapping relationship definition module for creating Ethernet service bandwidth mapping objects, which are used to establish the mapping relationship between the various kinds of service classes and the various kinds of bandwidth specifications; and
service bandwidth configuration module for creating Ethernet connection or Ethernet virtual connection objects, and associating the Ethernet service bandwidth mapping objects to the flow point objects of the Ethernet connection or Ethernet virtual connection objects for configuring service bandwidth of the network system,
a hardware processor for executing the service class definition module, the bandwidth specification module, the mapping relationship definition module, and the service bandwidth configuration module,
wherein the bandwidth specifications comprise one of the followings: committed information rate (CIR), committed burst size (CBS), excess information rate (EIR), and excess burst size (EBS);
wherein the various services comprise ServiceClassProfile objects, of which the attribute parameters include: attribute of classifyType for specifying the rules for classifying service classes, the rules reflecting the characteristics of various services provided by the network system; and attribute of classifyValue for specifying the ID value of various service classes classified by the rules; and the various kinds of service classes are defined by at least one of the following: virtual LAN ID, virtual LAN priority, Ethernet connection ID, and Ethernet virtual connection ID;
the service bandwidth mapping objects include at least one of the follows:
ServiceClassProfile pointer attributes including the ID of BandwidthProfile objects used to describe the service classes;
ingress bandwidth pointer attribute including the ID of BandwidthProfile objects used to describe ingress bandwidth of service; and
egress BandwidthProfile pointer attribute including the ID of BandwidthProfile objects used to describe egress bandwidth of service.

13. The network management computing device according to claim 12, wherein the BandwidthProfile objects include at least one among the followings:
committed information rate attribute for designating minimum bandwidth guarantee of service;
committed burst size attribute for designating minimum bust size guarantee of service;
excess information rate attribute for designating the rate allowed exceeding the minimum bandwidth guarantee of service; and
excess burst size attribute for designating the burst size allowed exceeding minimum guarantee of service.

14. The network management computing device according to claim 12 wherein the Ethernet connection or Ethernet virtual connection objects include at least one among the followings:
attribute of flow point list used to indicate all of the flow points included in Ethernet connection or Ethernet virtual connection; wherein, creating the flow point objects corresponding to port FPP of the Ethernet connection or Ethernet virtual connection, attribute parameters of the flow point objects include:
attribute of service bandwidth mapping list including a set of one or more the ID of service bandwidth mapping objects, and is used to describe bandwidth identifier of various services of the Ethernet connection or Ethernet virtual connection on the network port;
adding the flow objects into the Ethernet connection or Ethernet virtual connection objects when the Ethernet connection or Ethernet virtual connection objects are created.

* * * * *